(12) United States Patent
Kim et al.

(10) Patent No.: US 10,371,584 B2
(45) Date of Patent: Aug. 6, 2019

(54) SYSTEM AND METHOD FOR CONTROLLING TEMPERATURE IN MOBILE DEVICE

(71) Applicant: Samsung Electronics Co. Ltd., Suwon-si, Gyeonggi-do (KR)

(72) Inventors: Minsu Kim, Busan (KR); Kuntak Kim, Suwon-si (KR); Kiyeon Park, Hwaseong-si (KR); Chuleun Yun, Seoul (KR); Jubeam Lee, Osan-si (KR); Seyoung Jang, Seongnam-si (KR); Hyojae Cho, Yongin-si (KR); Bongsu Chun, Asan-si (KR); Younghee Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 14/982,802

(22) Filed: Dec. 29, 2015

(65) Prior Publication Data
US 2016/0131541 A1 May 12, 2016

Related U.S. Application Data

(63) Continuation of application No. 13/658,258, filed on Oct. 23, 2012, now Pat. No. 9,232,135.

(30) Foreign Application Priority Data
Nov. 10, 2011 (KR) .................. 10-2011-0116774

(51) Int. Cl.
*G01K 13/00* (2006.01)
*H04N 5/232* (2006.01)
*H04M 1/725* (2006.01)

(52) U.S. Cl.
CPC ........ *G01K 13/00* (2013.01); *H04M 1/72569* (2013.01); *H04N 5/23241* (2013.01); *H04M 2250/52* (2013.01)

(58) Field of Classification Search
CPC ........ H02J 7/0027; H02J 7/0091; H02J 7/047; G01K 13/00; G01K 17/08; G06F 17/13;
(Continued)

(56) References Cited

U.S. PATENT DOCUMENTS 5,451,892 A 9/1995 Bailey
6,470,289 B1 10/2002 Peters et al.
(Continued)

FOREIGN PATENT DOCUMENTS

CN 101030095 A 9/2007
CN 101558654 A 10/2009
(Continued)

*Primary Examiner* — Gail Kaplan Verbitsky
(74) *Attorney, Agent, or Firm* — Jefferson IP Law, LLP (57) ABSTRACT

A temperature control system of a mobile device is provided. The system includes a memory for storing a set temperature value and a release temperature value, a temperature sensor for sensing an internal temperature of the mobile device; at least one module that emits heat, and a controller. The controller compares the output of the temperature sensor with the set temperature value in a normal mode in order to determine whether the mobile device is overheated, and controls, if the mobile device is overheated, the at least one module to operate in a heat generation suppressing mode, compares the output of the temperature sensor with the release temperature value in the heat generation suppressing mode in order to determine whether to release the heat generation suppressing mode, and executes the normal mode if the heat generation suppressing mode is released according to the comparison result.

25 Claims, 5 Drawing Sheets

(58) Field of Classification Search
CPC .... G06F 17/3053; G06F 3/0418; G06F 1/206;
G06F 1/203; G06T 7/00; G02F 1/1343;
G09G 3/36
USPC .................... 374/152, 178, 170, 1, 4, 5, 120
See application file for complete search history.

(56) References Cited

U.S. PATENT DOCUMENTS

| | | | |
|---|---|---|---|
| 6,542,846 B1 | 4/2003 | Miller et al. | |
| 6,628,337 B1 | 9/2003 | Yoshida | |
| 7,520,669 B2 | 4/2009 | Yazawa et al. | |
| 8,315,747 B2* | 11/2012 | Suzuki | G06F 1/206 |
| | | | 429/9 |
| 9,232,135 B2* | 1/2016 | Kim | H04N 5/23241 |
| 9,356,466 B2* | 5/2016 | Han | H05K 7/20845 |
| 9,391,446 B2* | 7/2016 | Tanaka | H04W 52/0261 |
| 2007/0047199 A1* | 3/2007 | Tsutsui | G06F 1/203 |
| | | | 361/679.48 |
| 2007/0052830 A1 | 3/2007 | Kamon | |
| 2007/0285542 A1 | 12/2007 | Suzuki | |
| 2008/0152334 A1 | 6/2008 | Choi et al. | |
| 2008/0168287 A1 | 7/2008 | Berry et al. | |
| 2008/0291326 A1 | 11/2008 | Shishido et al. | |
| 2009/0073323 A1 | 3/2009 | Inoue | |
| 2009/0244363 A1 | 10/2009 | Sugimura et al. | |
| 2009/0248821 A1 | 10/2009 | Ariga | |
| 2009/0303197 A1 | 12/2009 | Bonczek et al. | |
| 2011/0069050 A1 | 3/2011 | Sirmon et al. | |
| 2011/0075055 A1 | 3/2011 | Bilbrey | |
| 2011/0127024 A1 | 6/2011 | Patel et al. | |
| 2011/0127970 A1* | 6/2011 | Wang | H02J 7/0091 |
| | | | 320/150 |
| 2011/0137607 A1 | 6/2011 | Hsieh | |
| 2012/0034502 A1* | 2/2012 | Nieh | H01M 10/0436 |
| | | | 429/62 |
| 2012/0188287 A1 | 7/2012 | Wurzel et al. | |
| 2013/0063368 A1 | 3/2013 | Geiger et al. | |
| 2014/0293538 A1* | 10/2014 | Han | H05K 7/20845 |
| | | | 361/690 |

FOREIGN PATENT DOCUMENTS

| | | |
|---|---|---|
| CN | 101578565 A | 11/2009 |
| JP | 2005-135350 A | 5/2005 |
| JP | 2005-190855 A | 7/2005 |
| JP | 2007-300607 A | 11/2007 |
| JP | 2008-311915 A | 12/2008 |
| JP | 2009-118159 A | 5/2009 |
| JP | 2009-200815 A | 9/2009 |
| JP | 2011-049908 A | 3/2011 |
| JP | 2011-182158 A | 9/2011 |
| KR | 10-2005-0095185 A | 9/2005 |
| KR | 10-2006-0074331 A | 7/2006 |
| KR | 10-0639332 A | 10/2006 |
| KR | 10-2007-0068839 A | 7/2007 |
| KR | 10-2007-0068855 A | 7/2007 |

* cited by examiner

SYSTEM AND METHOD FOR CONTROLLING TEMPERATURE IN MOBILE DEVICE

PRIORITY

This is a continuation application of a prior U.S. patent application assigned Ser. No. 13/658,258 filed on Oct. 23, 2012, which issued as U.S. Pat. No. 9,232,135 on Jan. 5, 2016, and which claims the benefit under 35 U.S.C. § 119(a) of a Korean patent application filed on Nov. 10, 2011 in the Korean Intellectual Property Office and assigned Serial No. 10-2011-0116774, the entire disclosures of which are each hereby incorporated by reference.

BACKGROUND OF THE INVENTION

1. Field of the Invention

The present invention relates to a system and method for controlling the operations of a mobile device. More particularly, the present invention relates to a system and method for controlling the operations of a mobile device according to its internal temperature.

2. Description of the Related Art

Mobile devices have been developed to simultaneously process a variety of functions, such as communication, multimedia, and the like. Mobile devices are getting thinner to enhance portability. However, thinner mobile devices have difficulty achieving efficient heat dissipation. Despite these difficulties that arise as mobile devices are made thinner, they are nonetheless required to execute an increasing variety of functions. For example, mobile devices may be developed with an increased number of processors, with an increased maximum clock speed, a larger Liquid Crystal Display (LCD) screen for improved brightness, a large capacity battery, a high resolution camera module, and the like. However, such increased functionality also causes undesirable heat generation in the mobile device.

Attenuation of heat generated from parts in a mobile device so as to cause the parts to remain under their maximum operating temperatures has been difficult because the mobile device cannot be turned off. Therefore, as the modules operate in the mobile device, heat is generated that increases the temperature therein. Although conventional systems control the clock speed using a temperature sensor in the processor, they cannot prevent the mobile device from overheating while in operation.

Therefore, a need exists for a system and method for attenuating the generation of heat from parts in a mobile device so as to cause the parts to remain under their maximum operating temperatures without the need to turn off the mobile device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and method that may detect a temperature inside a mobile device and control operations of at least one module that generates heat, thereby preventing the mobile device from overheating.

Another aspect of the present invention is to provide a technology that arranges a temperature sensor near a component that generates heat in the mobile device, detects the generation of heat with a processor, and controls the operations of a corresponding component, thereby preventing the temperature in the mobile device from rising.

In accordance with an aspect of the present invention, a temperature control system of a mobile device is provided. The system includes a memory for storing a set temperature value and a release temperature value, a temperature sensor for sensing an internal temperature of the mobile device, at least one module that emits heat, and a controller. The controller compares the output of the temperature sensor with the set temperature value in a normal mode in order to determine whether the mobile device is overheated, and controls, if the mobile device is overheated, the at least one module to operate in a heat generation suppressing mode, compares the output of the temperature sensor with the release temperature value in the heat generation suppressing mode in order to determine whether to release the heat generation suppressing mode, and executes the normal mode if the heat suppressing mode is released according to the comparison result.

In accordance with another aspect of the present invention, a method for controlling temperature in a mobile device is provided. The method includes a memory for storing a set temperature value and a release temperature value, a temperature sensor for sensing an internal temperature of the mobile device, and at least one module that emits heat. The method includes detecting, by the temperature sensor, an internal temperature of the mobile device in a normal mode, comparing the detected temperature of the temperature sensor with the set temperature value to determine whether the mobile device is overheated, controlling, if the mobile device is overheated, the at least one module to operate in a heat generation suppressing mode, comparing the output of the temperature sensor with the release temperature value in the heat generation suppressing mode in order to determine whether to release the heat generation suppressing mode, and executing the normal mode if the heat generation suppressing mode is released according to the comparison result.

In accordance with another aspect of the present invention, a system for controlling temperature in a mobile device is provided. The system includes a memory for storing a set temperature value and a release temperature value, at least one module that emits heat, at least one temperature sensor installed near the at least one module, and a controller. The controller compares an output of the at least one temperature sensor with the set temperature value in a normal mode in order to determine whether the at least one module is overheated and controls a corresponding at least one module that are overheated to operate in a heat generation suppressing mode, compares the output of the at least one temperature sensor for the at least one module operating in the heat generation suppressing mode with the release temperature value in order to determine whether to release the heat generation suppressing mode, and controls, if the heat generation suppressing mode of the corresponding at least one module is released according to the comparison result, the corresponding at least one module to operate in a normal mode.

In accordance with another aspect of the present invention, a method for controlling temperature in a mobile device is provided. The method includes a memory for storing a set temperature value and a release temperature value, at least one module that emits heat, and at least one temperature sensor installed near the at least one module. The method includes comparing an output of the at least one temperature sensors with the set temperature value to determine whether the mobile device is overheated in a normal mode, controlling, if it is determined that the mobile device is overheated, the at least one module to operate in a heat generation suppressing mode, comparing the output of the at least one temperature sensor of the at least one module operating in the heat generation suppressing mode with the release temperature value in order to determine whether to release the heat generation suppressing mode of the at least one module, and operating, if the heat generation suppressing mode of the module is released according to the comparison result, the at least one module in a normal mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the following exemplary embodiments of the present invention describe the surface temperature of a mobile device, the conversion temperature of a sensor, an overheating setting time period, and the like, it should be understood that the present invention is not limited thereto.

As will be described in more detail below, an exemplary mobile device may include a built-in temperature sensor that detects an internal temperature in real time. An Intelligent Overheating Protection Controller (IOPC) controls modules of the mobile device, as causes of heat generation in the mobile device via a temperature detected by the temperature sensor, thereby preventing the mobile device from overheating. The IOPC may be included in a controller of the mobile device, or separated therefrom. In the following description, it is assumed that the controller of the mobile device serves to perform the functions of the IOPC. Various causes of heat generation in mobile devices may occur, for example, cases in which the display unit, charger, camera module, and/or controller are overloaded. The controller controls the operations of the respective modules, such as the processor, a Liquid Crystal display (LCD), a charger, a camera module, and the like, so as not to exceed a preset temperature based on a temperature detected by the temperature sensor.

Examples of causes for heat generation in a mobile device may include cases in which the processor is too overloaded to execute applications, the charger module performs a charging operation with a large amount of current, the camera module takes a video, the display unit displays a large amount of data during execution of a game application, and the like. Heat energy generated in the mobile device accumulates and causes an increase in temperature on the outer surface of the mobile device, which deteriorates the performance of the mobile device. In order to prevent this, the system determines the relationship between the temperature on an outer surface of the mobile device with a temperature sensor (e.g., a thermistor). The analyzed temperatures detected by the temperature sensor are used in order to maintain an outer surface temperature, Tw, to control the modules which generate heat, thereby preventing low temperature burn.

For example, a surface temperature Tw may be set to prevent a low temperature burn, and that corresponding temperature value is empirically acquired by a thermistor.

When the mobile device is operated, the temperature sensor detects the internal temperature of the mobile device. The controller determines whether the temperature detected by the temperature sensor exceeds the empirically acquired temperature value. If the controller ascertains that the internal temperature increases, it controls the operations of the modules that generate heat in the mobile device. Examples of modules that generate heat include a controller, a display unit, a camera module, a charger, and the like. Although exemplary embodiments of the present invention may describe that the controller controls the heat generating modules listed above, it needs to be understood that the invention may also control other modules that generate heat in a mobile device.

If the controller ascertains that the internal temperature of the mobile device has increased, it may control the heat generating modules listed above. For example, the controller may control the maximum brightness (contrast) of the display unit (e.g., LCD) (which refers to a level of brightness that may maintain a temperature equal to or less than a surface temperature Tw on the front side of the mobile device), and reduce the transfer period of screen data to the display unit. The controller may reduce the charging current of the charger (which refers to an amount of charging current that can maintain a temperature equal to or less than a surface temperature Tw on the outside of the mobile device). For example, if the surface temperature Tw of the mobile device is equal to or greater than 45° C. (corresponding to a conversion temperature of a thermistor set to 55° C.) for over 30 minutes, the controller may reduce the charging current. If the charge in the battery is reduced to equal to or less than the lowest remaining amount of battery (e.g., 20%) with which the mobile device can be operated, the controller may increase the charging current. Thereafter, if the charge in the battery increases over the lowest remaining amount of battery (e.g., 25%) with which the mobile device can be operated, the controller controls the charging current of the battery again. During the process, the temperature, time, and the battery charging amount, may be set to proper values, which are determined according to an experiment or a user request. The frame rate or the resolution of the camera may also be limited so that the outer surface of the mobile device where the camera is located can maintain a temperature equal to or less than a surface temperature Tw. Moreover, the maximum processor clock speed of the controller may be limited so that the front and back sides of the mobile device where the processor is located can maintain a temperature equal to or less than a surface temperature Tw. Based on the foregoing, the appropriate levels for limiting heat generating modules can be empirically set.

Figure 1:
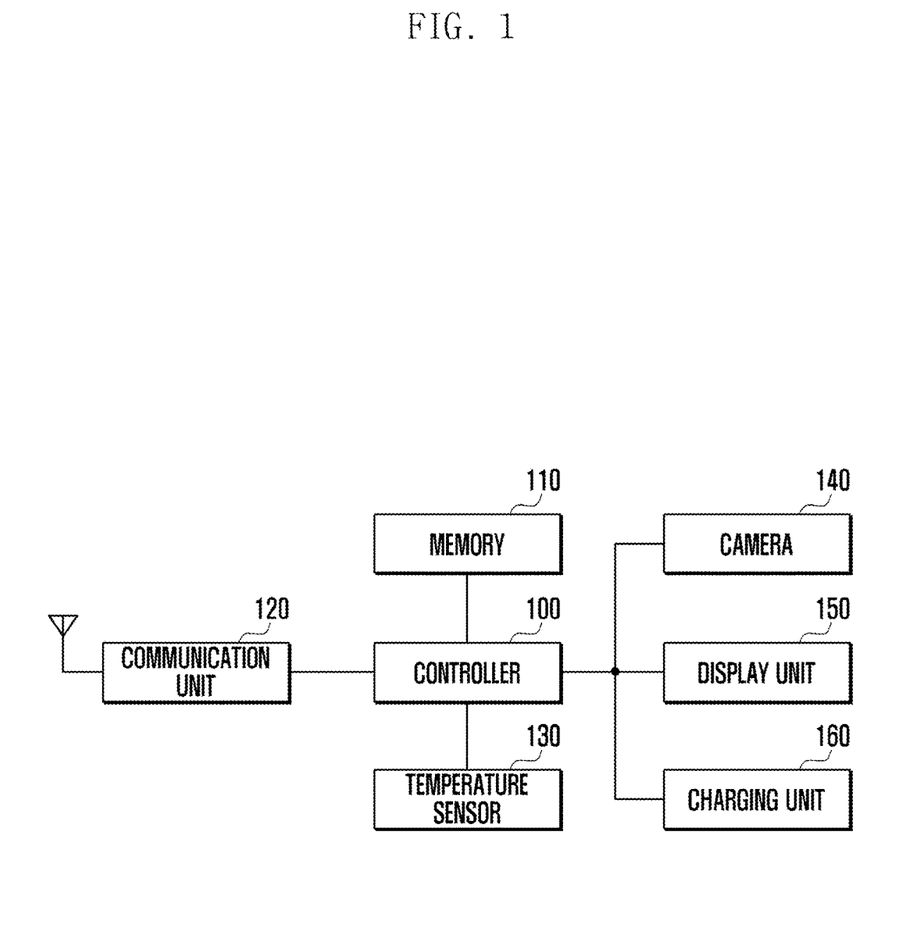
FIG. 1 illustrates a schematic block diagram of a mobile device according to an exemplary embodiment of the present invention.

FIG. 1 illustrates a schematic block diagram according to an exemplary embodiment of the present invention.

Referring to FIG. 1, a communication unit 120 communicates with external systems or base stations in wireless mode. The communication unit 120 may include a transmitter and a receiver. The transmitter up-converts the frequency of signals to be transmitted and amplifies the power of the signals. The receiver low-noise amplifies received signals, and down-converts the frequency of the received signals to a base band. The communication unit 120 may include a modulator for modulating signals to be transmitted and transferring them to the transmitter, and a demodulator for demodulating signals received via the receiver. The modulator and demodulator may employ Long Term Evolution (LTE), Wideband Code Division Multiple Access (WCDMA), Global System for Mobile (GSM), Wi-Fi, Wireless Broadband (Wi-Bro), Near Field Communication (NFC), Bluetooth, and the like, according to different communication protocols.

A controller 100 may control operations of the mobile device. The controller 100 may perform a temperature control function according to an exemplary embodiment of the present invention.

A memory 110 may include a program storage memory and a data storage memory. The program storage memory may store an Operating System (OS) of the mobile device and application programs. The data storage memory may store tables related to the operations of the mobile device and data created when the application programs are executed. The memory 110 may store a table for setting temperature values and/or the corresponding temperature retention times to determine whether the mobile device is overheated.

A temperature sensor 130 may detect an internal temperature of the mobile device and transfer it to the controller 100. The temperature sensor 130 may be implemented with a thermistor. The temperature sensor 130 may be installed at a location where the greatest amount of heat is generated or expected to be generated in the mobile device, and the location may be empirically determined. The temperature sensor 130 may be installed near the controller 100.

A camera 140 may acquire video data at a preset frame rate and with a preset resolution, in a camera operation mode, under the control of the controller 100. For example, the camera 140 may acquire a video at 30 frames per sec (30 fps) with a resolution of 1080 pixels in a normal mode, and a video at 15 fps 720 pixels in a heat generation suppressing mode.

A display unit 150 may display screen data at a preset transfer rate in a preset level of brightness under the control of the controller 100. For example, the display unit 150 may display screen data transmitted at a User Interface (UI) rendering rate of 60 Hz in a level of brightness of 300 cd in a normal mode, and screen data transmitted at a UI rendering rate of 30 Hz in a level of brightness of 230 cd in a heat generation suppressing mode.

A charging unit 160 may charge a battery (not shown) with preset charging current in a charge mode under the control of the controller 100. For example, the charging unit 160 may charge a battery with charging current of 1 A in a normal mode, and with charging current of 450 mA in a heat generation suppressing mode under the control of the controller 160. For example, the charging unit 160 may reduce the charging current from 1 A in a normal mode to 450 mA in a heat generation suppressing mode under the control of the controller 100. If a charging amount of the battery is decreased to equal to or less than a lowest acceptable charging ratio (e.g., 20%) in a heat generation suppressing mode, the controller 100 may increase the charging current from 450 mA to 1 A so that the mobile device can be normally operated. Thereafter, if the battery is charged to an amount equal to or greater than a lowest acceptable charging ratio (e.g., 25%), the controller 100 may, for example, adjust the charging current from 1 A to 450 mA.

The controller 100 may identify a normal mode or a heat generation suppressing mode according to a temperature detected by the temperature sensor 130. The controller 100 may control the operations of the camera 140, the display unit 150 and the charging unit 160 in a heat generation suppressing mode in order to reduce the amount of heat generated in the mobile device. Heat generation in the mobile device may be caused by continued operation of the controller 100. For example, if the controller 100 executes an application that requires a large amount of load, e.g., a game, or a number of applications simultaneously, it may continually operate or become overloaded and accordingly generate a large amount of heat. In that case, the controller 100 may reduce the system clock. For example, the controller 100 may use up to the maximum system clock rate (e.g., 1.4 GHz) in a normal mode. However, it may only use up to a preset clock rate (e.g., 500 MHz) in a heat generation suppressing mode.

The temperature on an outer surface of the mobile device may differ from the internal temperature of the mobile device detected by the temperature sensor 130. The temperature on the outer surface of the mobile device that the mobile device user can feel and the internal temperature of the mobile device, as detected by the temperature sensor 130, may be empirically measured, thereby setting a temperature to determine that a state in which an unacceptable heat is generated inside the mobile device. If, for example, the temperature sensor 130 is installed near the controller 100, the outer surface temperature and the detected temperature may be acquired as described in the following Table 1. The outer surface temperature refers to a temperature on the outer surface of the mobile device. The detected temperature refers to an internal temperature of the mobile device that is detected by the temperature sensor 130 and corresponds to the outer surface temperature.

TABLE 1

| Outer surface temperature [° C.] | 43 | 45 | 48 | 50 |
|---|---|---|---|---|
| Detected temperature [° C.] | 51 | 54 | 59 | 61 |

The detected temperature for concluding that the mobile device is overheated may be determined via a variety of methods. For example, concluding that the mobile device is overheated may be set via only a detected temperature. Alternatively, concluding that the mobile device is overheated may be set via a detected temperature and a period of time during which a corresponding detected temperature is maintained. For example, in order to conclude that the mobile device is overheated via only a detected temperature, if a detected temperature is 61° C. (or an outer surface temperature is 50° C.), the controller 100 may operate the mobile device in a heat generation suppressing mode. Regarding temperatures as described in Table 1, a suppression temperature Tw may be set to operate the mobile device in a heat generation suppressing mode by combining the detected temperature with a retention time. For example, the suppression temperature Tw may be set as in the following Table 2, and stored in the memory 110.

TABLE 2

| Detected temperature Tw [° C.] | 51 | 54 | 59 | 61 |
|---|---|---|---|---|
| Retention time | 4 hrs | 30 mins | 5 mins | Immediately |

As described in Table 2, the detected temperature Tt refers to a temperature that the temperature sensor 130 detects inside the mobile device, i.e., an internal temperature. When a detected temperature, as described in Table 2, is maintained for a corresponding amount of time, i.e., a retention time, the controller 100 may compare it with a preset temperature, Tw, and execute a heat generation suppressing mode. In that case, the controller 100 may count the retention time via an internal timer. If the controller 100 ascertains that the detected temperature is altered, it may alter the corresponding retention time and determine a temperature and a time period.

Because the mobile device includes a camera 140, a display unit 150, a charging unit 160 and a controller 100, which serve as causes of heat generation, operations in a normal mode and a heat generation suppressing mode may be defined as in the following Table 3.

TABLE 3

| | Normal mode | Heat generation suppressing mode |
|---|---|---|
| Transfer rate/Resolution of Camera | 30 fps/1080 p | 15 fps/720 p |
| Data reception rate/Brightness of Display unit | 60 Hz/300 cd | 30 Hz/230 cd |
| Charging current of Charging unit | 1 A | 450 mA |
| System clock of Controller | 1.4 GHz | 500 MHz |

As described in Table 3, the camera 140 may acquire a video of 1080 pixels at 30 frames per second in a normal mode, and a video of 720 pixels at 15 frames per second in a heat generation suppressing mode. Therefore, the camera 140 may reduce the generation of heat in a heat generation suppressing mode as compared with a normal mode. The display unit 150 may receive frame data at 60 Hz from the buffer of the controller 100 and display it at a level of brightness of 300 cd in a normal mode. The display unit 150 may also receive frame data at 30 Hz from the buffer of the controller 100 and display it at a level of brightness of 230 cd in a heat generation suppressing mode. Therefore, the display unit 150 may reduce the generation of heat in a heat generation suppressing mode as compared with a normal mode. The charging unit 160 may charge the battery with charging current of 1 A in a normal mode, and 450 mA in a heat generation suppressing mode. Therefore, the charging unit 160 may reduce the generation of heat during the charging operation. The controller 100 may use a system clock rate of maximum 1.4 GHz in a normal mode, and system clock rate of maximum 500 MHz in a heat suppressing mode. Therefore, the controller 100 may reduce the generation of heat.

As the temperature Tw is employed to set a heat generation suppressing mode, a temperature for releasing the heat generation suppressing mode, Ts, may be required that is called a release temperature. The release temperature Ts may be set as a specific detected temperature. For example, the release temperature Ts may be set to 50° C. or 51° C. Alternatively, the release temperature Ts may be set as a preset temperature to which a detected temperature Tt is lowered during the heat generation suppressing mode. That is, if a set temperature Tw is determined as described in Table 2, the release temperature Ts may be set as a temperature less than the currently detected temperature Tt. For example, if the detected temperature Tt is lowered from 61° C. to 59° C., from 59° C. to 54° C., from 54° C. to 51° C., and to less than 51° C.; or from 61° C. to 54° C., from 59° C. to 51° C., and to less than 51° C., these temperature may be set as a release temperature Ts.

Figure 2:
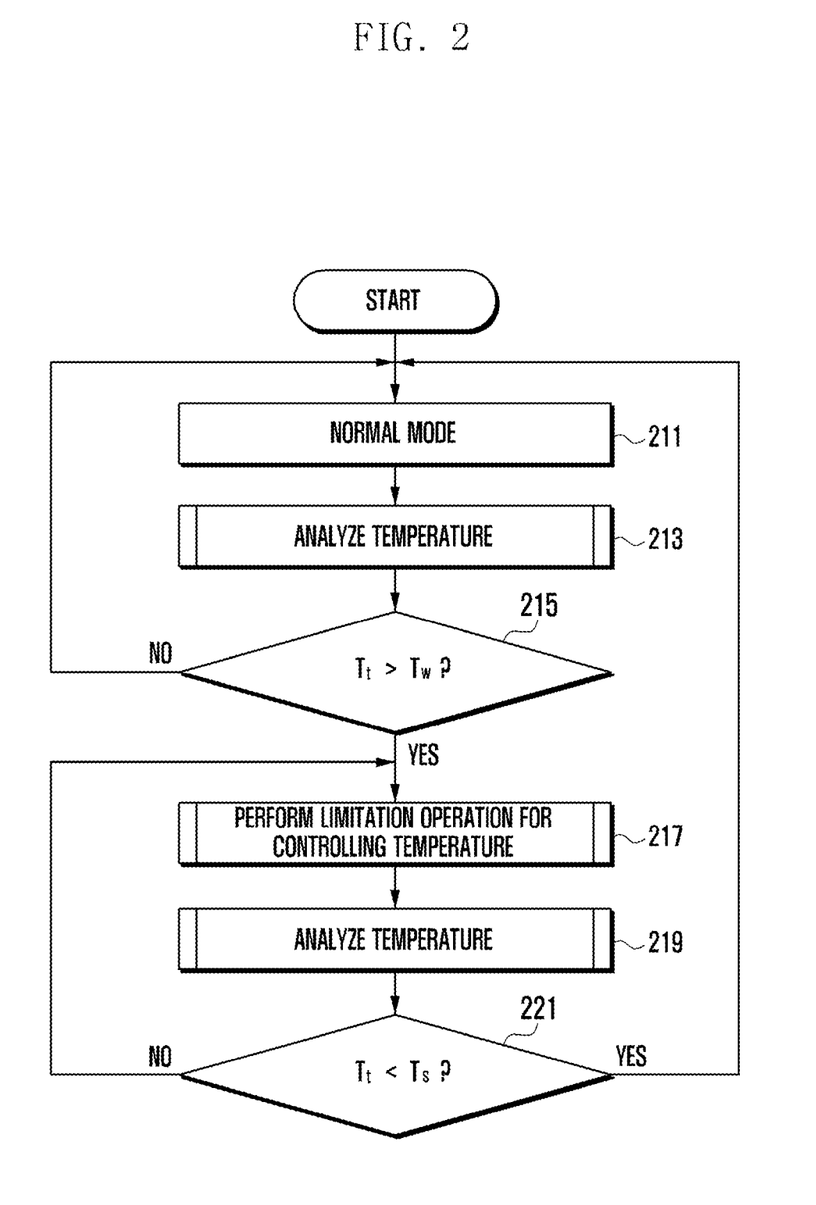
FIG. 2 illustrates a flowchart that describes a method for controlling temperature in a mobile device according to an exemplary embodiment of the present invention.

FIG. 2 illustrates a flowchart that describes a method for controlling a temperature of a mobile device according to an exemplary embodiment of the present invention. It is assumed that the heat generation modules are a controller 100, a camera 140, a display unit 150 and a charging unit 160. The operations in a normal mode and a heat generation suppressing mode are defined as Table 3.

Referring to FIG. 2, in a normal mode in step 211: the controller 100 may use the maximum system clock, the camera 140 may acquire a video at the maximum frame rate with the maximum resolution, the display unit 150 may receive screen data from the controller 100 at the maximum transfer rate and display it with the highest level of brightness, and the charging unit 160 may charge the battery with the maximum charging current in a charging mode. The controller 100 may receive an internal temperature of the mobile device, detected by the temperature sensor 130, and analyze it in step 213. The controller 100 may determine whether the detected temperature Tt is greater than a set temperature Tw to execute a normal mode or a heat generation suppressing mode in step 215. The analysis of the detected temperature, at steps 213 and 215, is described as follows, referring to FIG. 3.

Figure 3:
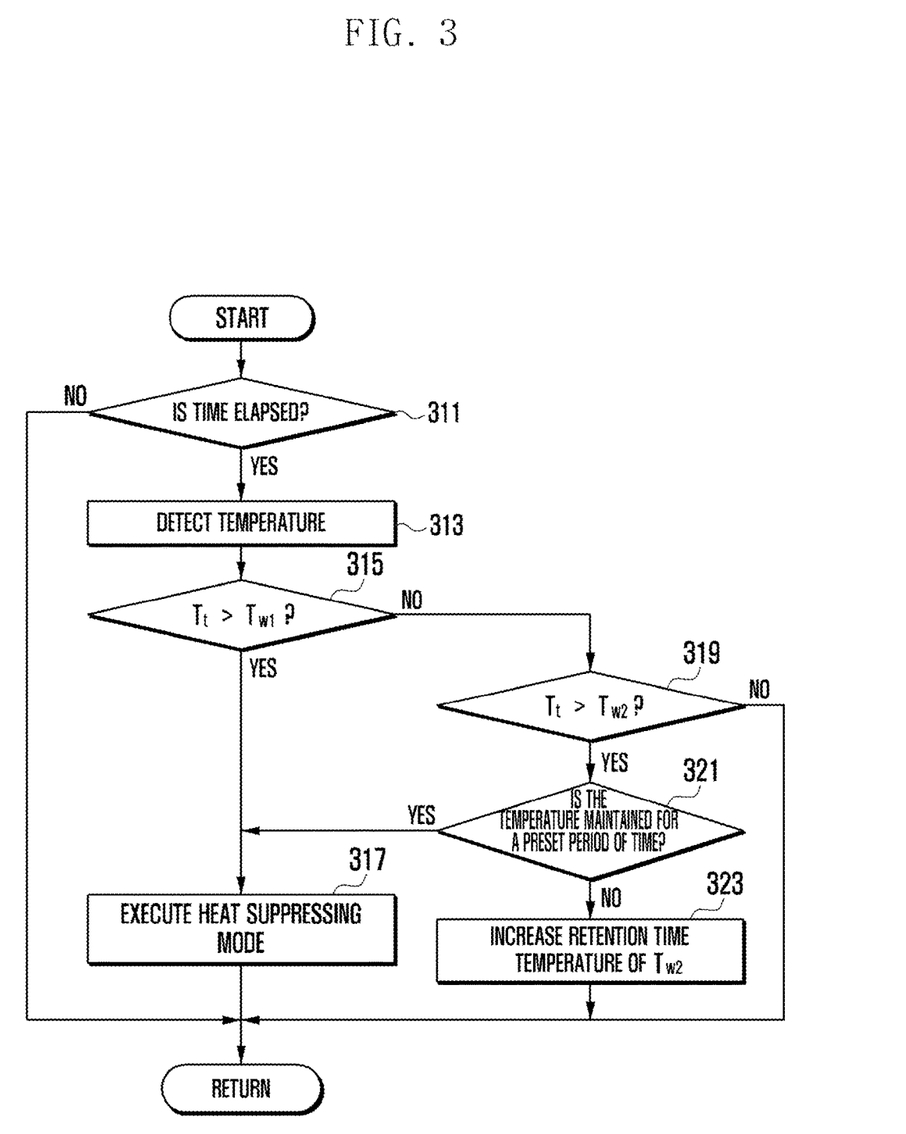
FIG. 3 illustrates a flowchart that describes a method for analyzing an internal temperature of the mobile device and determining whether a heat generation suppressing mode is executed according to an exemplary embodiment of the present invention.

FIG. 3 illustrates a flowchart that describes a method for analyzing an internal temperature of the mobile device and determining whether a heat generation suppressing mode is executed according to an exemplary embodiment of the present invention.

Referring to FIG. 3, the controller 100 may receive the output from the temperature sensor 130 at a measure of time and analyze the internal temperature of the mobile device. If it is determined that a preset period of time to detect has elapsed in step 311, the controller 100 may control the temperature sensor 130 to detect the internal temperature of the mobile device and receive it in step 313. The controller 100 may analyze the detected temperature at steps 315 to 319. If the set temperature Tw matches a first set temperature Tw1 as described in Table 2, the controller 100 may execute an immediate heat generation suppressing mode. If the set temperature Tw matches a second set temperature Tw2 as described in Table 2, the controller 100 may execute a heat generation suppressing mode so that the second set temperature Tw2 is maintained for the corresponding period of time. As described in Table 2, the first set temperature Tw1 may be 61° C. the second set temperature Tw2 may be 59° C., 54° C., and 51° C. and the retention time may be 5 mins, 30 mins, and 4 hours. Therefore, if the controller 100 detects the first set temperature Tw1 via the temperature sensor 130 in step 315, it may execute a heat generation suppressing mode to control the temperature of the mobile device in step 317.

On the contrary, if the controller 100 detects the second set temperature Tw2 in step 319, it may determine whether the second set temperature Tw2 is maintained in the mobile device for the corresponding period of time in step 321. If the controller 100 ascertains that the second set temperature Tw2 is maintained in the mobile device for the corresponding period of time at step 321, it may execute a heat generation suppressing mode at step 317. On the contrary, if the controller 100 ascertains that the second set temperature Tw2 is not maintained in the mobile device for the corresponding period of time at step 321, it may increase the retention time in step 323 and return to the process of FIG. 2. For example, as described in Table 2, if the second set temperature Tw2 is 59° C., the controller 100 may determine whether 5 minutes has elapsed at step 321. If the controller 100 ascertains that 5 minutes has elapsed at step 321, it may execute a heat generation suppressing mode at step 317. On the contrary, if 5 minutes has not elapsed at step 321, the controller 100 may increase the retention time and return to the process of FIG. 2. Likewise, if the second set temperature Tw2 is 54° C., the controller 100 may determine whether 30 minutes has elapsed at step 321. If the controller 100 ascertains that 30 minutes has elapsed at step 321, it may execute a heat generation suppressing mode at step 317. On the contrary, if 30 minutes has not elapsed at step 321, the controller 100 may increase the retention time and return to the process of FIG. 2 where it executes a normal mode. Likewise, if the second set temperature Tw2 is 51° C., the controller 100 may determine whether 4 hours has elapsed at step 321. If the controller 100 ascertains that 4 hours has elapsed at step 321, it may execute a heat generation suppressing mode at step 317. On the contrary, if 4 hours has not elapsed at step 321, the controller 100 may increase the retention time and return to the process of FIG. 2 where it executes a normal mode. However, if the detected temperature Tt is less than the second set temperature Tw2, the controller 100 may return to the process of FIG. 2 and executes a normal mode.

During the temperature analysis, if the internal temperature of the mobile device increases (e.g., from 51° C. to 54° C. or from 54° C. to 59° C.), the controller 100 may alter the retention time to a retention time corresponding to the increased temperature and re-analyze the temperature. If, for example, the internal temperature of the mobile device changes from 59° C. to 61° C., the controller 100 may immediately execute a heat generation suppressing mode irrespective of the retention time. If the internal temperature of the mobile device decreases (e.g., from 61° C. to 59° C., from 59° C. to 54° C., or from 54° C. to 51° C.), the controller 100 may alter the retention time to a retention time corresponding to the decreased temperature and re-analyze the temperature. If the internal temperature of the mobile device increases or decreases, the controller 100 may wait for a certain period of time (e.g., 30 seconds, 1 minute, or the like), and then perform the next process.

Referring back to FIG. 2, if it is determined that the detected temperature Tt is greater than a set temperature Tw at step 215, the mobile device may execute a heat generation suppressing mode to reduce its internal temperature in step 217. During the heat generation suppressing mode, as described in Table 3, the frame rate and the number of pixels of the camera 140, the transfer rate of screen data and the level of brightness of the display unit 150, the charging current of a charging unit 160 in a charging mode, and the system clock of the controller 100, may be set to corresponding values, respectively. When the mobile device enters a heat generation suppressing mode, the internal temperature starts to decrease. While the internal temperature is decreasing during the heat generation suppressing mode, the controller 100 receives the internal temperature analyzed by the temperature sensor 130 in step 219. The controller 100 determines whether the detected temperature Tt of the temperature sensor 130 is less than a release temperature Ts in step 221.

The release temperature Ts may be fixed to only a preset release temperature (e.g., 51° C. as described in Table 2). Alternatively, the release temperature Ts may be used as one of a number of release temperatures, like the set temperatures, together with corresponding time periods. In an exemplary embodiment of the present invention, the release temperature Ts may be fixed to only one release temperature. If it is determined that the detected temperature Tt is greater than the release temperature Ts at step 221, the controller 100 may return to step 217 and execute a heat generation suppressing mode. On the contrary, if the detected temperature Tt is less than the release temperature Ts at step 221, the controller 100 may return to step 211 and execute a normal mode. For example, if the controller 100 ascertains that the internal temperature of the mobile device is less than the release temperature Ts, it may control the camera 140, charging unit 160 and the processor in a normal mode, based on the values described in Table 2.

If the controller 100 detects a set temperature Tw to execute a heat generation suppressing mode during the normal mode, it may control the operations of the modules (e.g., camera, display unit, charging unit, and processor, and the like) that emit heat in the mobile device. If the internal temperature of the mobile device increases to a set temperature Tw during the normal mode, the controller 100 may analyze the heat generation causes and selectively control corresponding modules.

Figure 4:
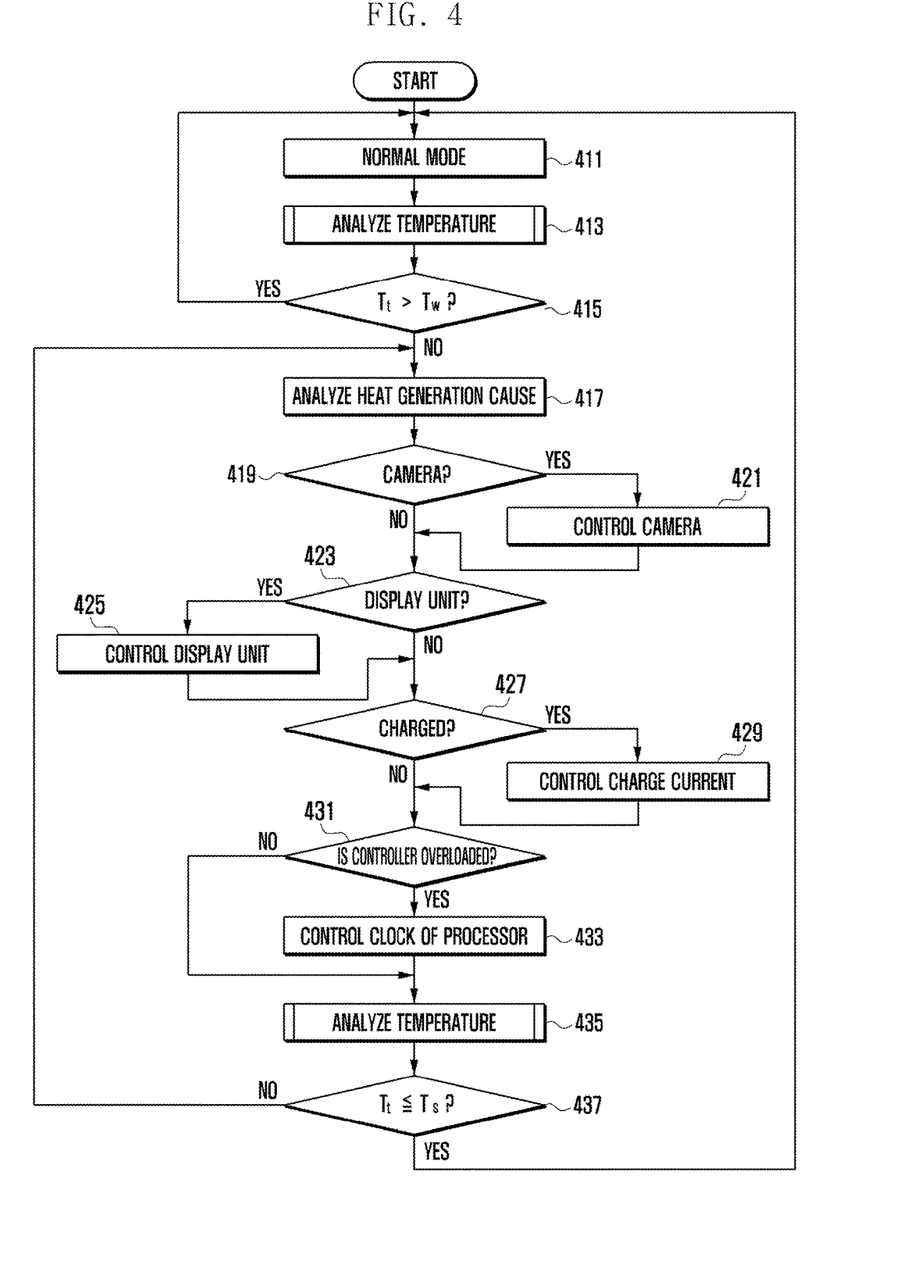
FIG. 4 illustrates a flowchart that describes a method for selectively controlling modules as heat generation sources when an internal temperature of the mobile device increases and decreasing the internal temperature according to an exemplary embodiment of the present invention.

FIG. 4 illustrates a flowchart that describes a method for selectively controlling heat generation causes when the temperature increases in the mobile device and decreasing the internal temperature, according to an exemplary embodiment of the present invention.

Referring to FIG. 4, the controller 100 may execute a normal mode in step 411, receive the internal temperature detected via the temperature sensor 130, as described above referring to FIG. 3, in steps 413 and 415, and analyze the internal temperature. The internal temperature may be analyzed as the same process as described above referring to FIG. 3. If the detected temperature Tt is greater than a set temperature Tw, the controller 100 may analyze the heat generation cause in step 417. For example, if the temperature increases in the mobile device, the controller 100 may analyze the currently executed applications, detect modules that increase the internal temperature, and operate the modules in a heat generation suppressing mode.

If the cause for heat generation corresponds to a camera 140, the controller 100 may operate the camera 140 in a heat generation suppressing mode via the following steps 419 and 421. If the heat generation cause corresponds to a display unit 150, the controller 100 may operate the display unit 150 in a heat generation suppressing mode via the following steps 423 and 425. If the cause for heat generation corresponds to a charging unit 160 in a charge mode, the controller 100 may operate the charging unit 160 in a heat suppressing mode via the following steps 427 and 429. If the cause for heat generation corresponds to a continued use of the controller 100, the controller 100 may control the system clock in a heat generation suppressing mode via the following steps 431 and 433. In an exemplary embodiment of the present invention, the camera 140, the display unit 150, the charging unit 160 and the system clock in a heat generation suppressing mode may be set to the values as described in Table 3.

If there are a number of causes for heat generation that have been analyzed at step 417, the controller 100 may control the corresponding modules in a heat generation suppressing mode. After performing steps 433 or 435, the controller 100 may receive the internal temperature of the mobile device, detected via the temperature sensor 130, and analyze it at step 435. The controller 100 may determine whether the detected temperature Tt is equal to or less than a release temperature Ts at step 437. If the controller 100 ascertains that the detected temperature Tt is equal to or less than a release temperature Ts at step 437, it may release the heat generation suppressing mode and return to step 411 where it executes a normal mode. On the contrary, if the controller 100 ascertains that the detected temperature Tt is greater than a release temperature Ts at step 437, it may return to step 417 and maintain the heat generation suppressing mode.

In an exemplary embodiment of the present invention, the set temperature Tw may be set to first set temperature Tw1 and second set temperature Tw2. If the detected temperature Tt is a first set temperature Tw1 (e.g., 61° C. as described in Table 2), the controller 100 may operate all the modules in the mobile device (e.g., camera, display unit, charging unit, and processor) in a heat generation suppressing mode. If the detected temperature Tt is between a first set temperature Tw1 and a second set temperature Tw2 (e.g., one of 51° C., 54° C. and 59° C. as described in Table 2), the controller 100 may identify modules that emit heat in the mobile device and operate the identified modules in a heat generation suppressing mode.

Figure 5:
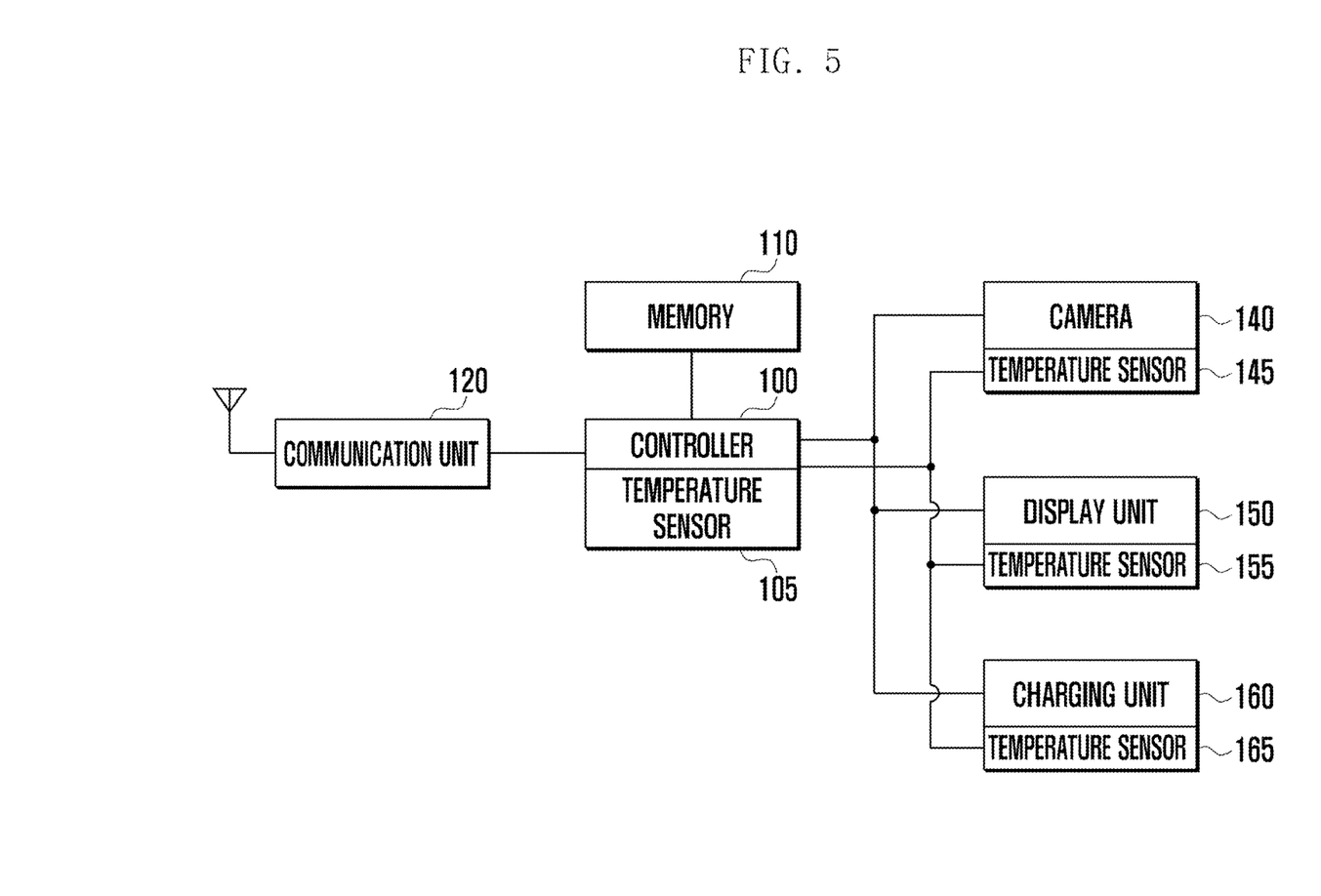
FIG. 5 illustrates a schematic block diagram of a mobile device according to an exemplary embodiment of the present invention.

FIG. 5 illustrates a schematic block diagram according to an exemplary embodiment of the present invention.

Referring to FIG. 5, the communication unit 120 may communicate with a base station or other external systems in wireless mode. The communication unit 120 may be configured with substantially the same components as the communication unit of FIG. 1 and thus perform the same or similar functions.

The controller 100 may control operations of the mobile device and perform a temperature control operation according to an exemplary embodiment of the present invention.

The memory 110 may include a program storage memory and a data storage memory. The program storage memory may store an Operating System (OS) of the mobile device and application programs. The data storage memory may store tables related to the operations of the mobile device and data created when the application programs are executed. The memory 110 may store a table for setting temperature values and/or the corresponding temperature retention times to determine whether the mobile device is overheated.

The temperature sensor 105 may be installed near the controller 100. The temperature sensor 105 may detect the internal temperature in the mobile device and transfer it to the controller 100. Heat generation in the mobile device may be caused by overload of the controller 100. For example, if the controller 100 executes an application that requires a large amount of processing, e.g., a game, or a number of applications simultaneously, it may become overloaded and accordingly generate a large amount of heat. In that case, the temperature sensor 105 may detect the temperature near the controller 100 and transfer it to the controller 100. As such, if the controller 100 ascertains that it is overheated, it may reduce the system clock speed. For example, the controller 100 may use up to the maximum system clock rate (e.g., 1.4 GHz) in a normal mode. However, it may use only up to a preset clock rate (e.g., 500 MHz) in a heat generation suppressing mode.

The camera 140 may acquire video data at a preset frame rate and with a preset resolution in a camera operation mode under the control of the controller 100. The temperature sensor 145 may detect a temperature of the camera 140 and transfer it to the controller 100. The controller 100 may operate the camera 140 in a normal mode or a heat generation suppressing mode according to the temperature detected via the temperature sensor 145. For example, the camera 140 may acquire a video, at 30 frames per sec (30 fps), with a resolution of 1080 pixels in a normal mode, and a video at 15 fps with a resolution of 720 pixels in a heat generation suppressing mode.

The display unit 150 may display screen data at a preset transfer rate and a preset level of brightness under the control of the controller 100. The temperature sensor 155 may detect the temperature of the display unit 150 and transfer it to the controller 100. The controller 100 may operate the display unit 150 in a normal mode or a heat generation suppressing mode according to the temperature detected via the temperature sensor 155. For example, the display unit 150 may display screen data transmitted at a UI rendering rate of 60 Hz at a level of brightness of 300 cd in a normal mode and screen data transmitted at a UI rendering rate of 30 Hz at a level of brightness of 230 cd in a heat generation suppressing mode.

The temperature sensor 165 may detect the temperature of the charging unit 160 and transfer it to the controller 100. The controller 100 may operate the charging unit 160 in a normal mode or a heat generation suppressing mode according to the temperature detected via the temperature sensor 165. The charging unit 160 may charge a battery (not shown) with preset charging current in a charge mode under the control of the controller 100. For example, the charging unit 160 may charge a battery with a charging current of 1 A in a normal mode, and with a charging current of 450 mA in a heat generation suppressing mode under the control of the controller 160. For example, the charging unit 160 may reduce the charging current from 1 A in a normal mode to 450 mA in a heat generation suppressing mode under the control of the controller 160. If an amount of charge in the battery is decreased to equal to or less than a lowest acceptable charging ratio (e.g., 20%) in a heat generation suppressing mode, the controller 100 may increase the charging current from 450 mA to 1 A so that the mobile device can be normally operated. Thereafter, if the battery is charged with a charging amount equal to or greater than a lowest acceptable charging ratio (e.g., 25%), the controller 100 may adjust the charging current from 1 A to 450 mA, for example.

The controller 100 may determine whether the modules (e.g., the controller 100, the camera 140, the display unit 150, and the charging unit 160) are required to operate in a normal mode or a heat generation suppressing mode according to the temperatures detected via the temperature sensors 105, 145, 155, and 165, respectively. In order to reduce the internal temperature of the mobile device, the controller 100 may control the system clock, the camera 140, the display unit 150 and the charging unit 160 to operate in a heat generation suppressing mode.

In another exemplary embodiment of the present invention, shown in FIG. 5, the controller 100 may detect the temperatures of the respective modules and control corresponding modules that are overheated, thereby preventing the mobile device from being overheated. To this end, the controller 100 may control the temperature of the mobile device in the same processes as the method of FIG. 4.

The controller 100 may execute a normal mode at step 411. The controller 100 may receive the temperatures of the respective modules detected via the temperature sensors 105, 145, and 155, and analyze them at steps 413 and 415.

The controller 100 may also receive a temperature of the charging unit 160 in a charging mode, detected via the temperature sensor 165. The charging unit 160 may execute the charging mode when the mobile device operates in a normal mode. Alternatively, the charging unit 160 may also execute the charging mode when the mobile device is turned off. In the following description, it is assumed that the charging unit 160 executes the charging mode when the mobile device operates in a normal mode. If the detected temperature Tt, detected by the temperature sensor(s) 105, 145 155 and/or 165, is greater than a set temperature Tw, the controller 100 may operate the corresponding module(s) in a heat generation suppressing mode.

If the heat generation cause corresponds to a camera 140, the controller 100 may operate the camera 140 in a heat generation suppressing mode. If the cause for heat generation corresponds to a display unit 150, the controller 100 may operate the display unit 150 in a heat generation suppressing mode. If the heat generation cause corresponds to a charging unit 160, the controller 100 may operate the charging unit 160 in a heat generation suppressing mode. If the heat generation cause corresponds to a system overload, the controller 100 may control the system clock in a heat generation suppressing mode. In another exemplary embodiment of the present invention, the camera 140, display unit 150, charging unit 160 and the system clock in a heat generation suppressing mode may be set to the values as described in Table 3.

If there are a number of heat generation causes, the controller 100 may control the corresponding modules in a heat generation suppressing mode. If the controller 100 ascertains that the mobile device is in an overheated state, it may operate corresponding modules that provide heat generation causes in a heat generation suppressing mode. The controller 100 may receive the temperatures of the modules operating in a heat generation suppressing mode via the temperature sensors respectively, and analyze them. The controller 100 may determine whether the detected temperatures Tt of the modules are equal to or less than release temperatures Ts, respectively. If the controller 100 ascertains that the detected temperatures Tt are equal to or less than release temperatures Ts respectively, it may release the heat generation suppressing mode of a corresponding module and operate it in a normal mode. On the contrary, if the controller 100 ascertains that the detected temperatures Tt are greater than release temperatures Ts respectively, it may maintain the heat generation suppressing mode of a corresponding module.

As described above, the mobile device is equipped with a variety of modules that may cause heat generation, and a sensor (e.g., a thermistor) for detecting the temperature inside the mobile device. The sensor may be located near the heat generation sources. The temperature sensor may detect the temperature according to heat from a processor and other parts in the mobile device. The exemplary system and method according to the invention controls the operations of a corresponding module and thus prevents the temperature in the mobile device from rising. Therefore, the exemplary system and method may prevent use interruptions or low temperature burns caused as the mobile device is overheated. For example, the exemplary system and method may control the operations of a processor, an LCD module, a camera module, a charger, and the like, as causes of heat generation in the mobile device, and thus prevent the outer surface of the mobile device from being overheated.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device, the device comprising:
a memory configured to store at least one set temperature value and a release temperature value;
a temperature sensor configured to detect a temperature of the mobile device;
at least one module comprising a camera; and
a controller,
wherein the controller is configured:
to compare the detected temperature of the temperature sensor with the at least one set temperature value in a normal mode of the at least one module, the set temperature value corresponding to a temperature used to determine whether to operate in a heat generation suppressing mode,
to change, if the detected temperature is greater than the at least one set temperature value, a mode of the at least one module from the normal mode to the heat generation suppressing mode,
to control the camera to acquire video data at a first frame rate in the heat generation suppressing mode,
to compare the detected temperature of the temperature sensor with the release temperature value in the heat generation suppressing mode of the at least one module, the release temperature value corresponding to a temperature used to determine whether to operate in the normal mode,
to change, if the detected temperature is lower than the release temperature value, the mode of the at least one module from the heat generation suppressing mode to the normal mode, and
to control the camera to acquire video data at a second frame rate in the normal mode, and
wherein the first frame rate is slower than the second frame rate.

2. The device of claim 1,
wherein the at least one module further comprises a charging circuit, and
wherein the controller reduces an amount of charging current in the heat generation suppressing mode.

3. The device of claim 1,
wherein the at least one module further comprises a display, and
wherein the controller reduces a frame rate of screen display data transmitted to the display in the heat generation suppressing mode.

4. The device of claim 1,
wherein the at least one module further comprises the controller, and
wherein the controller reduces a clock rate of the controller to a preset clock rate in the heat generation suppressing mode.

5. The device of claim 1,
wherein the at least one module further comprises a display, and
wherein the display comprises a liquid crystal display or a light emitting diode display.

6. The device of claim 1,
wherein the at least one module further comprises a display, and
wherein a transfer rate of screen data transmitted to the display is reduced by half in the heat generation suppressing mode.

7. The device of claim 1,
wherein the memory stores a first set temperature value and a second set temperature value, the second set temperature value being less than the first set temperature value, and a retention time for maintaining the second set temperature value, and
wherein the controller changes to the heat generation suppressing mode if the detected temperature is greater than the first set temperature value in the normal mode, and changes to, if the detected temperature is greater than the second set temperature value, the heat generation suppressing mode during the retention time.

8. The device of claim 7,
wherein the at least one module further comprises at least one of a charging circuit, a display, and the controller, or
wherein the controller reduces at least one of an amount of charging current in the heat generation suppressing mode, a level of brightness for screen data transmitted to the display in the heat generation suppressing mode, or a clock rate of the controller in the heat generation suppressing mode.

9. The device of claim 8, wherein the controller reduces a frame rate of screen data transmitted to the display from 60 Hz to 30 Hz in the heat generation suppressing mode.

10. The device of claim 9,
wherein a transfer rate of screen data transmitted to the display is reduced by half in the heat generation suppressing mode.

11. The device of claim 1, wherein the temperature of the mobile device comprises a temperature of a battery.

12. A mobile device, the device comprising:
a memory configured to store at least one set temperature value and a release temperature value;
a temperature sensor configured to detect a temperature of the mobile device;
at least one module comprising a camera; and
a controller,
wherein the controller is configured:
to compare, when the camera acquires video data at a first frame rate, the detected temperature of the temperature sensor with the at least one set temperature value, the set temperature value corresponding to a temperature used to determine whether to control the camera to acquire video data at a second frame rate being slower than the first frame rate,
to control, if the detected temperature is greater than the at least one set temperature value, the camera to acquire video data at the second frame rate,
to compare, when the camera acquires video data at the second frame rate, the detected temperature of the temperature sensor with the release temperature value, the release temperature value corresponding to a temperature used to determine whether to control the camera to acquire video data at the first frame rate being faster than the second frame rate, and
to control, if the detected temperature is lower than the release temperature value, the camera to acquire video data at the first frame rate.

13. The device of claim 12,
wherein the at least one module further comprises a charging circuit, and
wherein, if the detected temperature is greater than the at least one set temperature value, the controller reduces an amount of charging current to preset values.

14. The device of claim 12,
wherein the at least one module further comprises a display, and
wherein if the detected temperature is greater than the at least one set temperature value, the controller reduces a frame rate of screen display data transmitted to the display.

15. The device of claim 12,
wherein the at least one module further comprises the controller, and
wherein, if the detected temperature is greater than the at least one set temperature value, the controller reduces a clock rate of the controller to a preset clock rate.

16. The device of claim 12,
wherein the at least one module further comprises a display, and
wherein the display comprises a liquid crystal display or a light emitting diode display.

17. The device of claim 12,
wherein the at least one module further comprises a display, and
wherein, if the detected temperature is greater than the at least one set temperature value, a transfer rate of screen data transmitted to the display is reduced by half.

18. The device of claim 12,
wherein the memory stores a first set temperature value and a second set temperature value, the second set temperature value being less than the first set temperature value, and a retention time for maintaining the second set temperature value, and
wherein, if the detected temperature is greater than the first set temperature value, or if the detected temperature is greater than the second set temperature value during the retention time, the controller controls the charging circuit to use the second amount of charging current.

19. The device of claim 18,
wherein the at least one module further comprises at least one of a charging circuit, a display, and the controller, or
wherein, if the detected temperature is greater than the at least one set temperature value, the controller reduces at least one of an amount of charging current, a level of brightness for screen data transmitted to the display, or a clock rate of the controller.

20. The device of claim 19, wherein, if the detected temperature is greater than the at least one set temperature value, the controller reduces a frame rate of screen data transmitted to the display from 60 Hz to 30 Hz.

21. The device of claim 20,
wherein, if the detected temperature is greater than the at least one set temperature value, a transfer rate of screen data transmitted to the display is reduced by half.

22. The device of claim 12, wherein the temperature of the mobile device comprises a temperature of a battery.

23. A device for controlling temperature in a mobile device, the device comprising:
a memory configured to store at least one set temperature value and a release temperature value;
at least one module that emits heat comprising a camera;
at least one temperature sensor installed near the at least one module; and
a controller,
wherein the controller is configured:
to compare an output of the at least one temperature sensor with the at least one set temperature value in order to change a mode of the at least one module from a normal mode to a heat generation suppressing mode,
to control the camera to acquire video data at a first frame rate while the at least one module is in the heat generation suppressing mode,
to compare the output of the at least one temperature sensor with the release temperature value in order to change the mode of the at least one module from the heat generation suppressing mode to the normal mode, and
to control the camera to acquire video data at a second frame rate while the at least one module is in the normal mode, and
wherein the first frame rate is slower than the second frame rate.

24. The device of claim 23,
wherein the at least one module further comprises at least one of a charging circuit, a display, and the controller,
wherein the at least one temperature sensor comprises a plurality of temperature sensors installed near the at least one module, respectively, or
wherein the controller is configured to control at least one of:
the charging circuit to reduce an amount of charging current in the heat generation suppressing mode,
the display to reduce a level of brightness for screen data transmitted to the display in the heat generation suppressing mode, or
the controller to reduce a clock rate in the heat generation suppressing mode.

25. The device of claim 23, wherein the at least one temperature sensor senses a temperature of the battery.

* * * * *